May 5, 1959   F. J. BUCHMANN ET AL   2,885,267
METHOD OF PRODUCING HYDROGEN AND CARBON BLACK
Filed Dec. 28, 1955   2 Sheets-Sheet 1
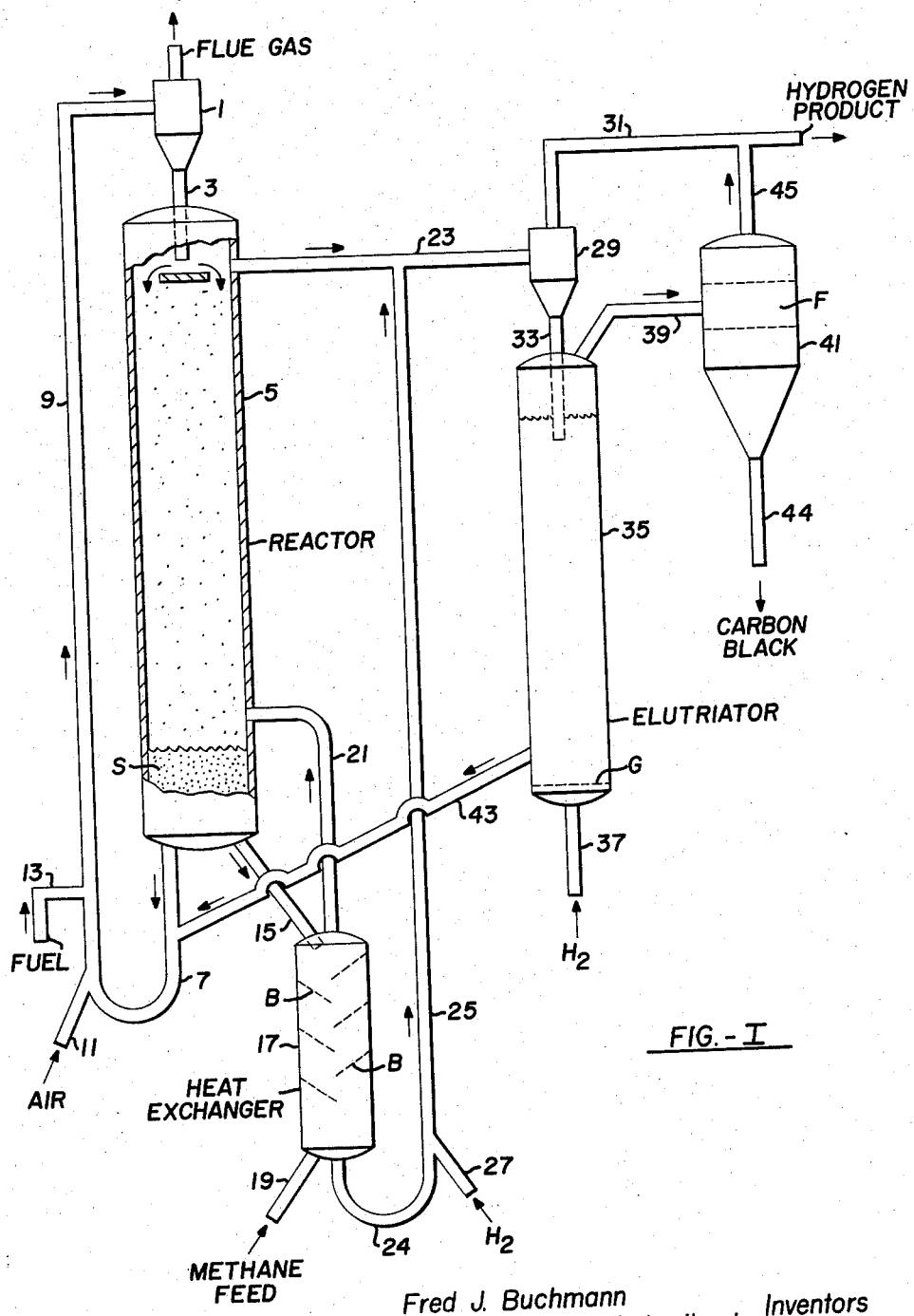
FIG.-I
Fred J. Buchmann
Charles Newton Kimberlin, Jr.   Inventors
By J. Cashman   Attorney May 5, 1959  F. J. BUCHMANN ET AL  2,885,267
METHOD OF PRODUCING HYDROGEN AND CARBON BLACK
Filed Dec. 28, 1955  2 Sheets-Sheet 2
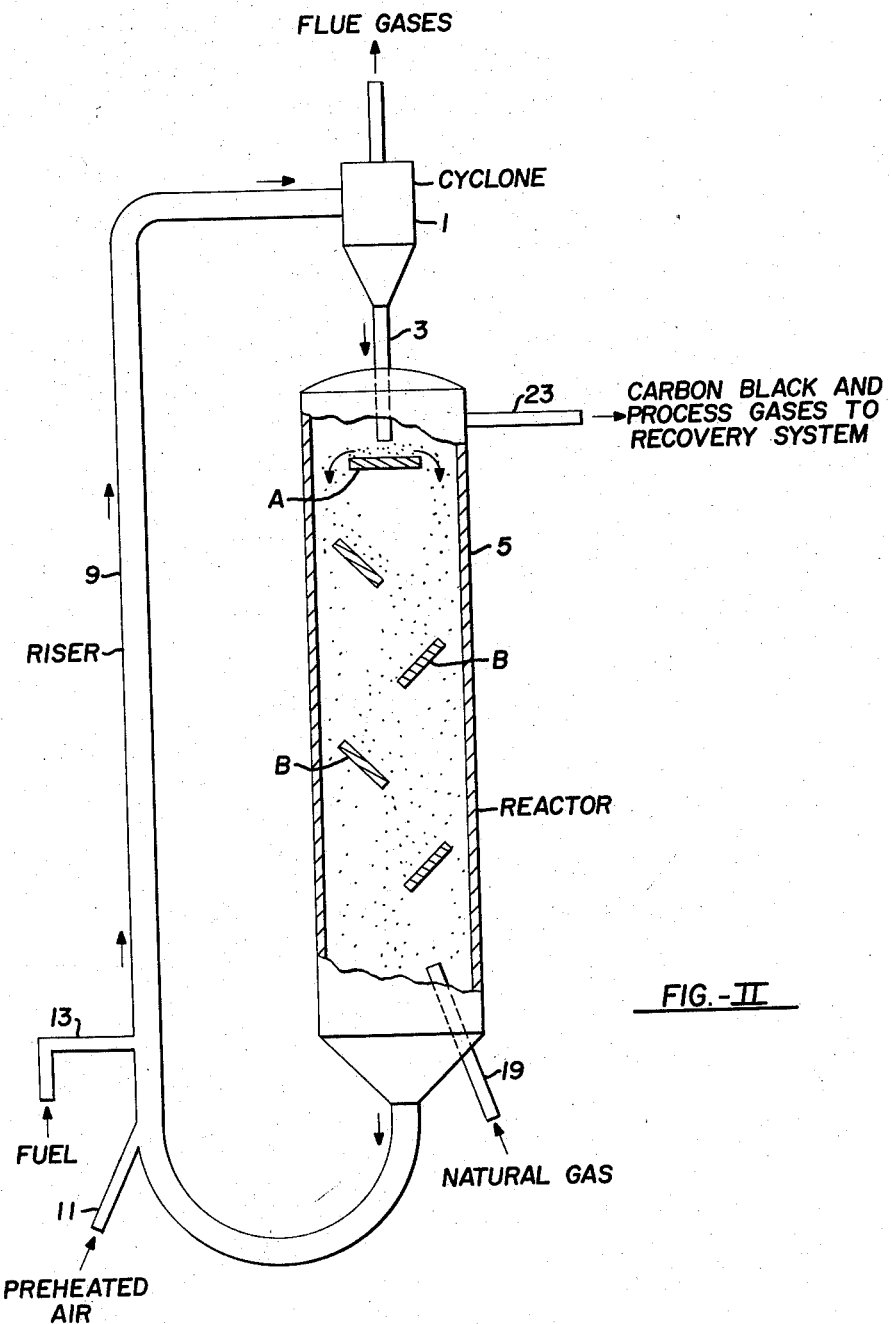
FIG.-II
Fred J. Buchmann
Charles Newton Kimberlin, Jr. Inventors
By J. Cashman Attorney United States Patent Office 2,885,267
Patented May 5, 1959

2,885,267

METHOD OF PRODUCING HYDROGEN AND CARBON BLACK

Fred J. Buchmann, and Charles Newton Kimberlin, Jr., Baton Rouge, La., assignors to Esso Research and Engineering Company, a corporation of Delaware Application December 28, 1955, Serial No. 555,886

2 Claims. (Cl. 23—212)

The present invention relates to the production of hydrogen and carbon black. More particularly, the present invention relates to an improved continuous process for the simultaneous production of high purity hydrogen and carbon black by cracking methane or other hydrocarbon gases.

At the present time there is an increasing demand for hydrogen in many industries and this is particularly true in the petroleum industry wherein hydrogen is employed in many processes, such as the hydrodesulfurization of gasoline and other petroleum products. Heretofore and prior to this invention a commercial method for producing hydrogen was by the so-called reformation of methane or natural gas. In this process methane or a gas rich in methane was contacted at elevated temperatures with a catalyst in the presence of added steam whereby the hydrocarbons, such as methane, was oxidized to form carbon monoxide and hydrogen. In commercial operations, this process was usually carried out in a reformer furnace, that is to say, a furnace having tubes disposed in a shell. These tubes were usually about 2" in diameter and contained the catalyst. The tubes were spaced apart within the shell and in order to supply the heat for the highly endothermic reaction of reforming some of the hydrocarbon gas fed through the tubes was burned in the space around the tubes in order to maintain the temperature within the tubes at least about 1600° F. The product from the reforming furnace was thereafter treated with steam at elevated temperature in the presence of another catalyst in order to convert the CO present in the product from the reforming step to $CO_2$ and additional hydrogen in a reaction referred to as the water-gas shift reaction. The product from this second reaction was cooled to room temperature and then contacted with an alkaline solution, such as an aqueous solution of triethanolamine, sodium hydroxide, etc., whereby the carbon dioxide was dissolved in the said aqueous medium and the gas recovered from this treatment was predominantly hydrogen. This process involving, as it does, several steps and the use of rather large volumes of liquid is not adapted to produce hydrogen at a low cost.

In brief compass, the present invention provides a method for producing hydrogen and also salable carbon black at relatively low cost by cracking methane or some other hydrocarbon gas in a system wherein a circulating stream of hot solids supplies the heat of the cracking reaction, serves to scour the walls of the reactor to remove formed carbon black, serves to preheat the feed gas, rapidly cool the cracked product and finally provide a filtering medium for recovering the formed carbon black.

The main object of the present invention is to produce hydrogen at a relatively low cost.

Another object of the present invention is to produce hydrogen and at the same time produce carbon black of good quality.

Other and further objects of the present invention will be apparent to those who are familiar with the present art.

In the accompanying drawing there is shown, diagrammatically, in Fig. I the essential elements of a plant in which a preferred modification of the present invention may be carried into effect and; in Fig. II, a modification of the plant shown in Fig. I is depicted.

Similar reference characters refer to similar parts in the views.

Referring in detail to Fig. I, a powdered material, such as mullite, heated to a temperature of from 2000°–2500° F. in a manner hereinafter described in detail, is withdrawn from a solids-gas separator 1 and passed by gravity through line 3 into the top of reactor 5 wherein the said powdered material passes downwardly against an upflowing hydrocarbon gas and wherein the hydrocarbon gas is cracked to form hydrogen and carbon black. The feed gas enters the present system through line 19 and passes upwardly in heat exchanger 17 in heat exchange relationship with downwardly flowing hot solids from reactor 5 which are charged to the top of the said heat exchanger through line 15. The preheated feed gas is withdrawn from heat exchanger 17 through line 21 and charged to reactor 5 at a lower point thereof as shown. The gasiform product containing suspended carbon black is withdrawn from reactor 5 through line 23 and charged into a solids-gas separator 29 wherein entrained solids are separated from the gasiform product and passed by gravity via line 33 to an elutriator 35. The gasiform material which is principally hydrogen is withdrawn from 29 via line 31 and delivered to storage (not shown).

The said hot solids which pass downwardly through reactor 5 in what might be termed "rain phase" collect at the bottom of reactor 5 in the form of a bed S. These solids are withdrawn through line 7 and pass into transfer line burner 9. Air is injected into the lower portion of transfer line burner 9 through line 11 and a fuel, such as natural gas, is charged to transfer line 9 via line 13. The air and fuel gas injected into transfer line burner 9 by lines 11 and 13, respectively, are preferably preheated to a temperature in the range of 1200° to 1800° F. to permit attaining the high temperatures desired in burner 9. The fuel is burned in line 9 and the resulting hot fumes serve to preheat the solids charged thereto and at the same time act as a carrier gas to transfer the solids upwardly through line 9 to the gas-solids separator 1. Flue gas is rejected from the system from the separator 1. The flue gas may be utilized in the present system to recover sensible and chemical heat in suitable equipment (not shown).

A portion of the solids in bed S of reactor 5 is withdrawn therefrom through line 15 and charged to baffled heat exchanger 17, previously referred to, wherein the said solids pass downwardly against the upflowing hydrocarbon gas feed whereby the latter is preheated to a temperature of 1500°–2500° F. The solids passing through heat exchanger 17 are withdrawn from the bottom thereof through line 24 and charged to a transfer line 25. In order to serve as a carrier gas of the solids in line 25 hydrogen gas may be charged to a lower point of 25 through line 27. As indicated in the drawing, the solids pass through line 25 to line 23 and thence to solids-gas separator 29 wherein the hydrogen is separated from the solids and the latter are delivered to elutriator 35 via line 33. It is pointed out that the cooled solids which are withdrawn from line 25 and charged to line 23 serve to cool the hot products issuing from the upper portion of reactor 5 via line 23 thus improving the quality of the carbon black suspended in the gasiform product. The coarse heat carrier solids introduced into line 23 serve the further purpose of entraining or "filtering out"

the carbon black so that the finely divided carbon black can be efficiently retained and separated from the hydrogen in solids-gas separator 29.

In elutriator 35 the carbon black is separated from the heat carrier solids by causing the hydrogen-containing gas charged to the bottom of said elutriator in line 37 to flow upwardly through the solids to remove the carbon and separate it from the inert solids. The hydrogen gas carries the carbon black from the upper portion of elutriator 35 via line 39 to vessel 41 containing a filtering means F through which the carbon black laden hydrogen is forced whereupon the carbon black is separated from the hydrogen and withdrawn from the bottom of vessel 41 through line 44 and delivered to storage (not shown). The hydrogen, substantially freed of carbon, is withdrawn overhead from vessel 41 via line 45 and charged to line 31 for delivery to the hydrogen product storage.

Referring again to elutriator 35, the solids substantially freed of carbon are withdrawn from a lower portion of said elutriator 35 via line 43 and charged to line 7 for reheating and reuse in reactor 5.

In Fig. II there is shown an apparatus layout in which the present invention may be carried out, the showing in said Fig. II being fragmentary with respect to the complete plant and the modification depicted therein has reference to the use of a baffled reactor and a gas seal disposed in the upper portion of said reactor.

Referring in detail to Fig. II, the fragmentary showing of the complete plant illustrates a modified reactor. It will be noted that in order to improve contact between downflowing solids and upflowing gasiform material in this modification, the reactor is provided with a plurality of spaced apart baffles B. It will also be noted that in this modified reactor directly beneath the discharge end of line 3, there is provided a horizontal baffle A which, in conjunction with solids disposed thereon, provides a gas seal to prevent gasiform material and/or solids from passing upwardly through 3 into the solids-gas separator 1. Otherwise the operation of the plant in this modification is substantially the same as that previously described in reference to Fig. I.

In order more fully to describe the present invention the following specific example is set forth below:

EXAMPLE I

Natural gas having a methane content of about 95%, the remainder being mostly ethane, is treated under the following conditions in reactor 5:

Powdered solids _____ Mullite.
Particle size of solids _____ 300–500 microns.
Temperature of solids to reactor ____ 2500° F.
Pressure _____ Atmospheric.
Superficial gas velocity _____ 4 ft./sec. at inlet.
Lbs. of solids charged to reactor per M s.c.f. of gas charged _____ 1500.
Residence time of gas in reactor _____ 4.2 seconds.
Yield:
    S.c.f. of hydrogen formed per M s.c.f. of hydrocarbon gas treated _____ 1900 s.c.f.
    Concentration of hydrogen in gaseous products, vol. percent _ 96.5.
    Lbs. of carbon black produced per M s.c.f. of hydrocarbon gas treated _____ 16.

To recapitulate briefly, the present invention relates to a continuous method of producing a relatively low cost hydrogen and at the same time producing carbon black of good quality. The invention comprises causing powdered solids heated to a temperature of from 2000°–2500° F. to fall like rain through an upwardly flowing hydrocarbon gas such as methane, natural gas or any normal gaseous hydrocarbon, whereby the said gas undergoes thermal cracking to form hydrogen and carbon black. The falling solids which may be catalytic as well as inert serve to scour the inner walls of the reactor to prevent substantial accumulation of carbon thereon. The solids are collected at a lower point in the reaction zone, removed therefrom and mixed with the product gas containing suspended carbon black to aid in recovery of the carbon from the gasiform product. The mixture of heat carrier solids and carbon are then treated in an elutriator to separate the carbon black from the hot solids, the former being recovered as product and the latter being returned to the reactor after reheat for further use in the process.

In the foregoing specific example it will be understood that the same is illustrative thereof but does not impose any limitation on the invention. Good results are obtained by operating under the following conditions:

Table A

|  | Broad | Preferred |
| --- | --- | --- |
| Powdered solids | Mullite, sand, coke, cracking catalyst, alumina. | Mullite. |
| Particle size of solids | 100–1,500 microns | 300–500 microns. |
| Temperature | 2,000–2,800 ° F | 2,100–2,500 ° F. |
| Pressure | 0–25 p.s.i.g | 0–10 p.s.i.g. |
| Superficial gas velocity in reaction zone, ft./sec. | 0.2–15 | 1–10. |

Many modifications of the invention will be apparent to those who are familiar with the present art without departing from the spirit thereof.

What is claimed is:

1. The method of cracking gaseous hydrocarbons to form hydrogen and carbon black which comprises introducing the gases to be cracked while in preheated condition into the lower intermediate portion of a reaction vessel, introducing hot solid particles while at a temperature materially above the cracking temperature of said gas into the upper portion of said reaction vessel, showering said solid particles downwardly through said reaction vessel against a rising current of said gases whereby the gas is heated to cracking temperature by contact with free falling solids particles, withdrawing solid particles from the bottom of said reaction vessel at a rate sufficient to prevent the accumulation of solid particles above the point of introduction of the gases in said vessel, heating a portion of the solids so withdrawn to a temperature materially above the cracking temperature of said gases and returning them to the top of said vessel as aforesaid, withdrawing hot cracked products comprising carbon black and hydrogen from the upper portion of said reaction vessel, passing a portion of the solids withdrawn from the bottom of the vessel countercurrently to the incoming feed gas to preheat the feed gas and cool the said solids, mixing the cooled solids with the hot cracked products, separating the product hydrogen from the carbon black and solids and recycling the solids to the top of the reactor vessel.

2. The method of cracking gaseous hydrocarbons to form hydrogen and carbon black which comprises introducing the gases to be cracked while in preheated condition into the lower intermediate portion of a reaction vessel, introducing hot solid particles while at a temperature materially above the cracking temperature of said gas into the upper portion of said reaction vessel, showering said solid particles downwardly through said reaction vessel against a rising current of said gases whereby the gas is heated to cracking temperature by contact with free falling solids particles, withdrawing solid particles from the bottom of said reaction vessel at a rate sufficient to prevent the accumulation of solid particles above the point of introduction of the gases in said vessel, heating a portion of the solids so withdrawn to a temperature materially above the cracking temperature of said gases and returning them to the top of said vessel as aforesaid, withdrawing hot cracked products comprising carbon black and hydrogen from the upper portion of said reaction vessel, passing a portion of the solids withdrawn from the bottom of the vessel countercurrently to the incoming feed gas to preheat the feed gas and cool the said solids, mixing the cooled solids with the hot cracked products, separating the product hydrogen from the carbon black and solids, separating carbon black from the solids by elutriation and combining the solids so separated with solids withdrawn from the reactor vessel, heating the solids so combined to a temperature materially above the cracking temperature of said gases and returning them to the top of the reactor vessel as aforesaid.

References Cited in the file of this patent

UNITED STATES PATENTS

| | | |
|---|---|---|
| 2,389,636 | Ramseyer | Nov. 27, 1945 |
| 2,585,984 | Alexander et al. | Feb. 19, 1952 |
| 2,604,380 | Beekhuis | July 22, 1952 |
| 2,642,346 | Keith | June 16, 1953 |
| 2,647,041 | Robinson | July 28, 1953 |